June 11, 1935. L. EDENBURG Re. 19,604
ELECTRICAL CONDENSER
Original Filed Jan. 25, 1928
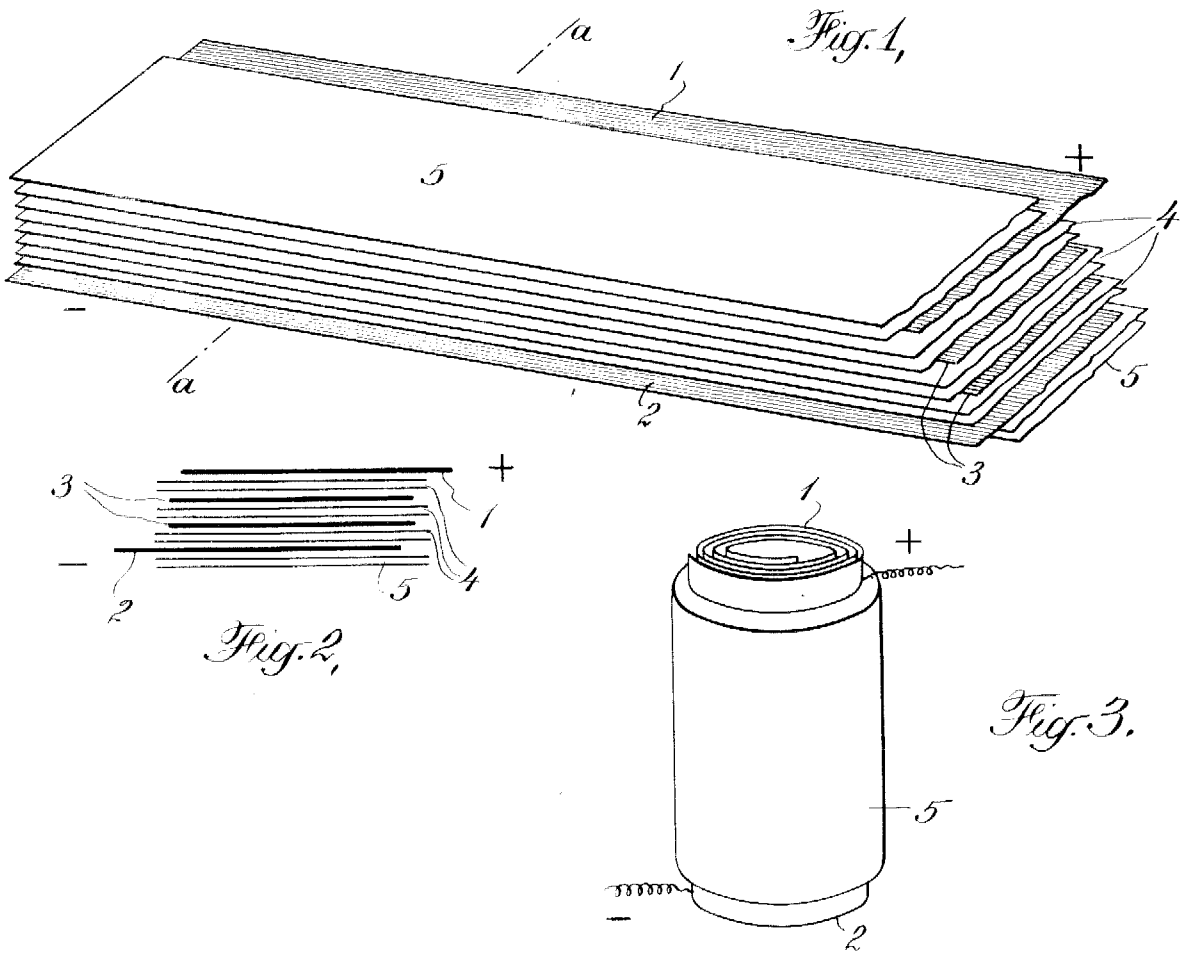
INVENTOR
Louis Edenburg
BY
William F. Nickel
ATTORNEY Reissued June 11, 1935 Re. 19,604

UNITED STATES PATENT OFFICE 19,604

ELECTRICAL CONDENSER

Louis Edenburg, Antwerp, Belgium, assignor to Nova Electric Corporation, New York, N. Y., a corporation of New York Original No. 1,924,711, dated August 29, 1933, Serial No. 249,276, January 25, 1928. Application for reissue February 9, 1934, Serial No. 710,512

14 Claims. (Cl. 175—315)

My invention relates to improvements in electrical condensers; especially electrical condensers of the type made by putting together sheets of thin metal foil separated by insulation.

An object of my invention is to provide an electrical condenser that is very effectually insulated, and adapted to be produced in units of high capacity.

Another object of the invention is to provide an electrical condenser which is easy and inexpensive to manufacture and which is made of materials that render it both efficient and durable in practice.

These and other objects and advantages of the invention are set forth in the following description, taken with the accompanying drawing; on which a preferred form of my invention is illustrated. This description, however, is explanatory only, and I may make changes in such matters as size, shape, arrangement of parts, and mode of proceeding, and still keep within the principle of the invention, as the same is defined in the appended claims.

On the drawing:—

Figure 1 is a perspective view showing how the sheets of conductive and insulating materials are assembled in a condenser according to my invention.

Figure 2 is a section taken on the line *a—a* on Figure 1; and

Figure 3 shows such a condenser after the same has been completed.

On the drawing, the same numerals identify the same parts throughout.

In producing a condenser according to my invention, I prefer to employ aluminum foils interleaved with paper and impregnated in a bath of glycerin and borax. To permit the glycerin and borax solution to permeate the condenser more quickly and thoroughly, the impregnation may be done in a vacuum and the solution may be heated preferably to a temperature not over 250° F. The reaction obtained is as follows:

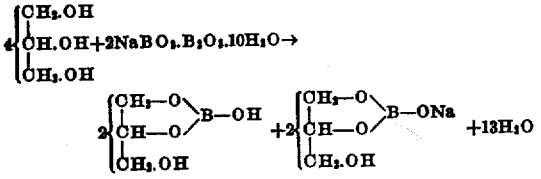

In assembling the condenser I first lay down the insulation 5; which may consist of say two sheets or strips of paper of the required length. On these strips I then lay a strip of aluminum foil 2, so placed that one edge overlaps the adjacent edge of the insulation and projects somewhat; while the opposite edge terminates short of the other edge of the strips of paper 5. This strip of foil is covered by similar strips of insulation, say two in number, indicated at 4, the edges of the strips 4 coinciding with the edges of the strips 5. Upon the insulation 4 I place a strip of aluminum foil 3 which is narrower than the insulation 4, and is overlapped by the paper along both edges. On top of this relatively narrow strip of foil 3, I place more insulation 4 in the form of, say, two strips of paper; and on the top of these strips I lay another relatively narrow strip of aluminum 3 in the same position as the former strip 3. Upon this strip 3 I also put two more strips or layers of paper insulation 4; and upon these layers I impose a strip of aluminum foil 1 which is wider than the strips 3. This strip 1 projects along one edge like the strip 2; and its opposite edge terminates short of the other edge of the strip of insulation. If these strips of foil and paper are rolled up as indicated in Figure 3, one edge of the strip of aluminum foil 1 will project at one end of the roll and one edge of the aluminum strip of foil 2 will project at the other end of the roll; the remaining edges of the strips 1 and 2 and all the edges of the strips 3 being well covered by insulation 4 and 5. This strip 1 can be connected to one terminal of an electric circuit, attached to one part of the projecting edge of the strip; and the opposite terminal of the circuit can be united to the projecting edge of the strip 2. Both the strips 3, however, are disconnected and isolated.

After assembly, the condenser is impregnated in a liquid mixture of borax and glycerin at the required temperature, I have found that one part of borax to four or five parts of glycerin gives good results, but these proportions are not critical and may be varied widely. The liquid impregnating substance may be placed in a suitable container and when the condenser is dipped into it the air is drawn out, so that the impregnation takes place in a vacuum. A mixture of these ingredients is very desirable because glycerin has a high dielectric constant and the borax has good forming properties on aluminum. The impregnation may last for two hours, and after it is finished the condenser is squeezed and compressed enough to expel any surplus of liquid impregnating material. Of course the length of time for impregnation may likewise be varied.

The characteristics of electric condensers are such that, in use, the electrical leakage increases rapidly as the voltage increases, especially before the plates are formed. By "formed" I mean that electrochemical phenomenon which takes place in electrolytic condensers, and which gradually reduced the leakage current at the time during which the voltage applied increases.

It is therefore, advantageous to put electrolytic condensers in series. While the capacity is thereby reduced, the leakage is reduced so much more as to make a better condenser all round in the end. By including the isolated strips 3, I obtain the advantage of series-connected condensers and save much material and space.

When completed, the condenser can be used in connection with radio apparatus to eliminate filament batteries and for other purposes.

The condenser can be made up as a rolled condenser, or be finished flat, in layers, without rolling.

Preferably the adjacent edges of the isolated conductive layers 3 are a little nearer to the edges of the insulating sheets 4 than the inner or non-projecting edges of the sheets 1 and 2.

The fibrous insulation may be left out altogether and thicker aluminum plates may be held spaced by rigid attachment from one or more points. A solution of borax and glycerin may then be poured into a container which will house the plates, and thus form another type of condenser—a semi-solid type.

Having described my invention what I believe to be new and desire to secure and protect by Letters Patent of the United States is:

1. An electric condenser comprising a pair of strips of aluminum foil to be of opposite polarity, isolated conductive strips between the first named strips, and insulation comprising one or more strips of fibrous material to separate the conductive strips from one another, such strips and insulation being rolled into form, impregnated with a liquid consisting of borax and glycerin, and evacuated of air between the strips.

2. An electrolytic condenser comprising a pair of aluminum strips adapted to be energized at opposite polarity, and a plurality of further strips of aluminum located between said first mentioned strip and metallically disconnected therefrom, separating members of porous sheet material interposed between said first mentioned strips and said second mentioned strips, and connections to said first mentioned strips for charging and discharging the same, all of said strips and said separating members being in the form of a roll, and an electrolyte consisting of borax and glycerine solely common to all of said plates, and in which said roll is submerged.

3. An electrical condenser comprising film forming electrodes of aluminum, separated by an electrolytic mixture consisting solely of glycerine and borax, there being sufficient glycerine in said mixture to neutralize said borax.

4. An electrical condenser comprising aluminum electrodes, a dielectric surface film on at least one of said electrodes consisting of an aluminum compound being formed upon said electrodes, said electrodes being separated from each other by an electrolytic mixture absorbed by a fibrous spacing medium composed of glycerine and borax solely, there being sufficient glycerine in said mixture to neutralize said borax.

5. An electrical condenser comprising film forming electrodes of aluminum foil separated by an electrolytic mixture composed solely of glycerin and borax and having about one part of borax to five parts of glycerine in said mixture.

6. An electrolytic condenser comprising a plurality of strips of fibrous material interleaved with a pair of strips of aluminum foil; the method of impregnating the assembly in a hot liquid electrolytic mixture composed solely of glycerine and borax and electrolytically forming a dielectric film on one of said strips.

7. An electrolytic condenser comprising a plurality of strips of absorbent material interleaved with a pair of strips of aluminum foil; the method of impregnating the assembly in a hot liquid electrolytic mixture composed solely of glycerine and borax, expelling the surplus liquid by compression and electrolytically forming a dielectric film on one of said aluminum strips.

8. An electrolytic condenser comprising a plurality of strips of absorbent material interleaved and rolled together with a pair of strips of aluminum foil; the method of impregnating the assembly in a hot liquid electrolytic mixture composed solely of glycerine and borax, expelling surplus liquid by compression and electrolytically forming a dielectric film on one of said aluminum strips.

9. The method of preparing an electrolyte for electrolytic condensers which consists in mixing glycerin and an alkali borate and raising the mixture to a temperature of 250° F.

10. The method of preparing an electrolyte for electrolytic condensers which consists in mixing glycerin and an alkali borate and raising the mixture to a temperature in the order of 250° F.

11. As an electrolyte for an electrolytic condenser, a liquid mixture of glycerin and an alkali borate heated to a predetermined temperature to provide the necessary viscosity for impregnating the condenser.

12. As an electrolyte for an electrolytic condenser, a liquid mixture of glycerin and an alkali borate in the ratio of approximately 4 to 1 respectively.

13. As an electrolyte for an electrolytic condenser, a liquid mixture of glycerin and an alkali borate in the ratio of approximately 4 to 1 respectively, and heated to a temperature to provide the necessary viscosity for impregnating the condenser.

14. As an electrolyte for an electrolytic condenser, a liquid mixture of glycerin and an alkali borate heated to a predetermined temperature to provide the necessary viscosity for impregnating the condenser, there being sufficient glycerine in said mixture to neutralize said alkali borate.

LOUIS EDENBURG.